S. HORNEY.
Scrapers.
No. 144,202. Patented Nov. 4, 1873.
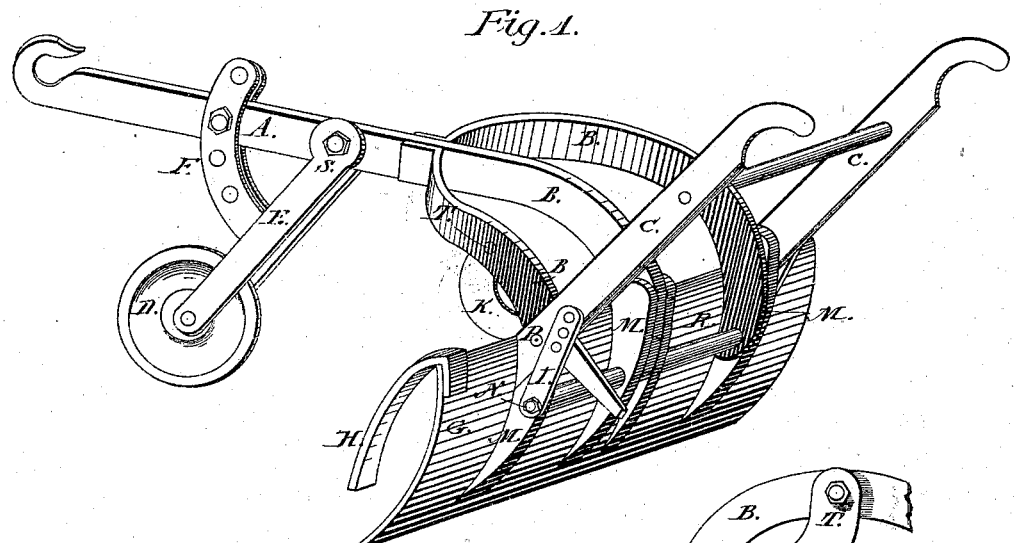
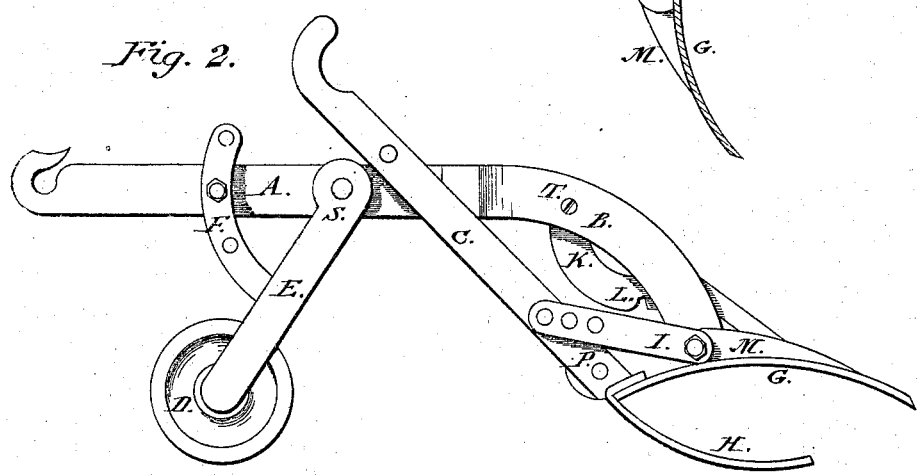
Attest:
Nelson A. Hunt
Caleb Elliott
Inventor;
Solomon Horney
By F. B. Hunt
Atty.

UNITED STATES PATENT OFFICE.

SOLOMON HORNEY, OF RICHMOND, INDIANA.

IMPROVEMENT IN SCRAPERS.

Specification forming part of Letters Patent No. 144,202, dated November 4, 1873; application filed August 4, 1873.

*To all whom it may concern:*

Be it known that I, SOLOMON HORNEY, of Richmond, county of Wayne and State of Indiana, have invented certain Improvements in Revolving Scrapers, of which the following is a specification:

My invention relates to an improvement in revolving scrapers, constructed in such manner as to be used as a scraper or scoop, as desired, by simply adjusting the parts, as hereinafter described.

Figure 1 is a perspective view of the scraper in position. Fig. 2 is a side elevation with the scraper turned over, as seen when unloaded. Fig. 3 is a section, showing a portion of the draw-bar, to which the scraper is attached, and the catch-lever which holds the scraper in position when at work.

A is the beam; B B B, draw-bars, attached to the ribs M by means of the rod N, Fig. 3, passing through the sleeve R. The scraper G revolves upon the rod N, and is held in place by means of the catch-lever K, having the notch L, which catches over the upper edge of the scraper. The spring-runners H are also attached to the upper corners of the scraper G. The handles C are attached to the ribs M by the pivot P, and the straps I are also attached to the ribs and to the handles in such manner as to allow the handles to be adjusted to any required height, by means of a series of holes in the strap I, the handles working on the pivot P, Fig. 2. The spring-runners attached to the scraper hold it in position when unloading, as shown in Fig. 2, the round of the handles falling forward and resting on the beam A. The caster-wheel D and sweep F are attached to the beam of the scraper, so that the beam is not only held up, but held in any required position, and the single-tree prevented from falling about the horses' heels. The caster may be set up or down, as required, by adjusting the sweep F by means of a bolt passing through it and through the beam. The caster-wheel is suspended from the pendant E, hinged at S. The catch-lever K is attached to the draw-bar at T, and has the notch or catch L, which drops over the upper edge of the scraper G when in position for work; and when the load has been carried to the spot desired, all the operator has to do is to lift the lever K and release the scraper, when it immediately revolves and assumes the position shown in Fig. 2, when the spring-runners hold the scraper off the ground, the handles resting forward upon the beam, the whole being held up by the caster and its attachments, the same as a plow or any other implement drawn by a team.

By adjustment of the handles in relation to the scraper, and providing a series of notches, L, in lever K, the scraper G may be held in any required position to form a scoop as well as a scraper.

Having thus fully described my invention, what I claim, and desire to secure by Letters Patent, is—

1. The spring-runners H, attached to the scraper for the purpose of holding the same off the ground while discharging its load, substantially as described.

2. The beam A, having the draw-bars B B attached, said bars being pivoted to the ribs M by means of the rod N, or its equivalent, the scraper revolving upon said rod, substantially as described.

3. The handles C, attached to the ribs M, in the manner shown, in combination with the straps I for adjustment, whereby the scraper may be placed in position to operate as a scoop, substantially as described.

SOLOMON HORNEY.

Witnesses:
WILLIAM N. BARR,
JUSTUS CAVENDER.